United States Patent
Bernard

(10) Patent No.: US 6,625,281 B1
(45) Date of Patent: Sep. 23, 2003

(54) METHOD FOR EXTENDING THE USEFUL LIFE OF A CORDLESS TELEPHONE BACKUP BATTERY DURING A POWER OUTAGE CONDITION

(75) Inventor: Bruce Bernard, Richmond (CA)

(73) Assignee: Vtech Communications Ltd., Tai Po (HK)

( * ) Notice: Subject to any disclaimer, the term of this patent is extended or adjusted under 35 U.S.C. 154(b) by 0 days.

(21) Appl. No.: 09/557,691

(22) Filed: Apr. 25, 2000

(51) Int. Cl.⁷ .............................. H04M 1/00; H04B 1/38
(52) U.S. Cl. ...................... 379/413; 455/574; 455/572
(58) Field of Search .......................... 379/413, 413.01, 379/413.02, 395.01, 399.01, 413.04, 414; 455/573, 574, 575, 95, 343, 571, 572; 340/825.44

(56) References Cited

U.S. PATENT DOCUMENTS

| | | | |
|---|---|---|---|
| 5,095,308 A | | 3/1992 | Hewitt .................. 340/825.44 |
| 5,237,603 A | * | 8/1993 | Yamagata et al. .......... 455/34.1 |
| 5,369,798 A | * | 11/1994 | Lee .............................. 455/574 |
| 5,661,780 A | | 8/1997 | Yamamoto et al. ........... 379/61 |
| 6,085,114 A | * | 7/2000 | Gibbons et al. ............. 455/574 |
| 6,178,523 B1 | | 1/2001 | Klein ........................... 714/24 |
| 6,501,969 B1 | * | 12/2002 | Cannon et al. .............. 455/574 |

FOREIGN PATENT DOCUMENTS

| | | | | |
|---|---|---|---|---|
| JP | 8125744 A | 5/1996 | ............ H04M/1/72 |

* cited by examiner

Primary Examiner—Rexford Barnie
(74) Attorney, Agent, or Firm—Michael D. Bednarek; Shaw Pittman LLP

(57) ABSTRACT

The disclosure discloses a method for extending the length of time over which a cordless telephone system can operate without an external source of power. The method involves detecting a power supply outage, determining that a telephone call is not currently being handled, placing the portable unit into a mode of reduced power consumption, and placing the base unit into a mode of reduced power consumption. After a period of time, the base unit resumes functionality, determines whether a call is being initiated, and handles any such calls. If the system is not active, the base unit re-enters its mode of reduced power consumption, and the cycle is repeated.

6 Claims, 2 Drawing Sheets

METHOD FOR EXTENDING THE USEFUL LIFE OF A CORDLESS TELEPHONE BACKUP BATTERY DURING A POWER OUTAGE CONDITION

BACKGROUND OF THE INVENTION

Cordless telephones have become a common fixture in the modern household, to the extent that many consumers now have few, if any, conventional corded telephones. While the convenience, mobility, and high sound quality of cordless telephones have attracted many consumers, one of their drawbacks is that they consume more power than can be provided by a conventional telephone line. Consequently, modern cordless telephones must be plugged into a power outlet for operation.

One significant drawback of wall-powered cordless telephones is that such telephones commonly become inoperative during a power outage. If the telephone consumer does not also own a conventional corded telephone that operates on telephone line power, the consumer is then unable to place a telephone call reporting the power outage, or other emergencies. As a result, consumers must either keep an unwanted conventional telephone in service, or risk elimination of telephone services in the event of a power outage. Even if a consumer does keep a corded telephone in service, they will be inconvenienced by having to locate and utilize the corded telephone while power is out.

Some prior art cordless telephone designs have addressed this problem by including a rechargeable battery pack in the cordless telephone base unit, which can temporarily provide power to the base unit when the wall power supply fails. However, the effectiveness of this solution is limited by the significant power consumption of a typical cordless telephone system, resulting in limited battery life.

It is therefore an object of this invention to maximize cordless telephone utilization time following a power outage by placing the system into a sleep mode, during which power consumption is reduced.

It is another object of this invention to periodically check for incoming or outgoing calls such that the system retains functionality during the power outage.

It is yet another object of this invention to control the frequency with which the system checks for call activity based upon the power level remaining in the rechargeable batteries.

SUMMARY OF THE INVENTION

The invention involves a cordless telephone system, including a base unit and a portable unit, each capable of operating from a rechargeable battery pack as a power source. The base unit is further capable of operating on power supplied by an external source, such as a wall outlet and AC-to-DC converter.

In accordance with the method of the invention, the base unit detects when the external source of power fails. If the telephone system is not currently handling a call, the portable unit is placed into a mode in which its power consumption is reduced. The base unit is also placed into a mode of reduce power consumption, during which time calls cannot be processed. The length of the sleep period can be fixed at a predetermined interval. Alternatively, the period length can vary based on the amount of power remaining in the base unit battery. In one embodiment, the sleep period is interrupted immediately upon receipt of an incoming call on the telephone line to which the base unit is connected.

After sleeping for a period of time, the base unit circuits are awakened. The base unit then determines whether the telephone system is active. The telephone system will be deemed active if, for example, a telephone call is being placed by a user of the handset, or an incoming call is being received on the telephone line into which the base unit is connected. If the telephone system is active, the base unit handles the call.

Finally, when the telephone system is not active, and power is still not being supplied by the external power source, the base unit is placed back into the state of reduced power consumption, and the cycle is repeated.

DETAILED DESCRIPTION OF THE INVENTION

Figure 1:
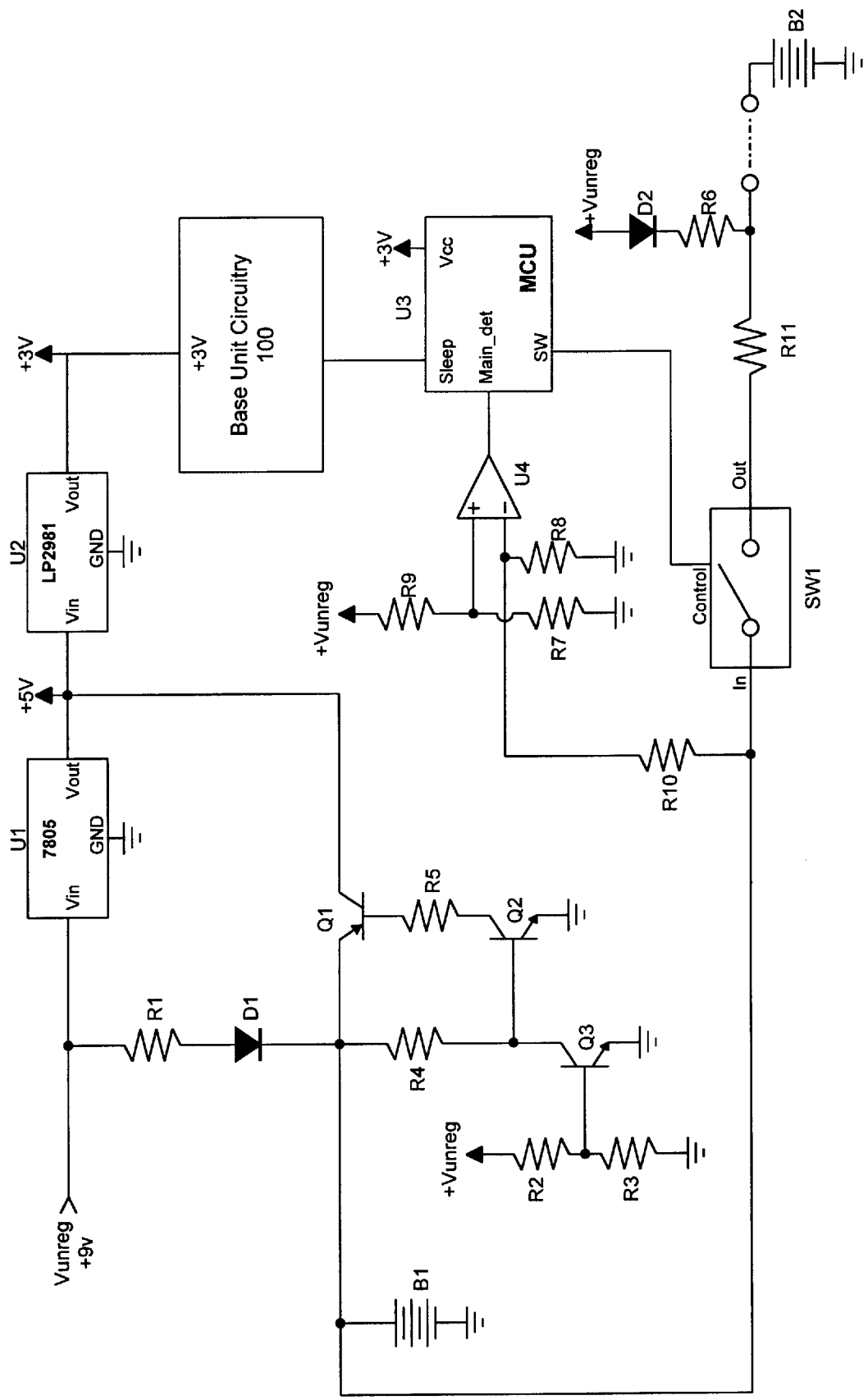
FIG. 1 of the drawings is a schematic diagram of one embodiment of the invention.

While this invention is susceptible to embodiment in many forms, there is shown in the drawings and will herein be described in detail specific embodiments, with the understanding that the present disclosure is to be considered as an exemplification of the principles of the invention and is not intended to limit the invention to embodiments illustrated.

The present invention comprises a method and apparatus for extending the duration over which a cordless telephone can operate after its external power source has failed. The invention places both the base unit and portable unit of the cordless telephone into a low-power mode while inactive and operating on battery power.

In the embodiment of FIG. 1, a primary external power source is applied to the base unit at the external power source input, Vunreg. In this embodiment, approximately +9 VDC is applied to Vunreg, typically converted from a wall outlet AC voltage by an AC-to-DC converter, which can be either internal to the base unit or external. During normal operation, regulator U1 converts the Vunreg voltage level to +5 VDC. Regulator U2 then regulates the voltage level down to +3 VDC for distribution to the remaining active components in the base unit.

The external power source also charges batteries B1 and B2. Base unit battery B1 is charged through current limiting resistor R1 and diode D1. Diode D1 prevents the reverse flow of current from battery B1 to Vunreg in the event of a failure of the primary power source. The external power source charges portable unit battery B2 when the portable unit is electrically engaged with the base unit. Current flows from Vunreg, through diode D2 and current limiting resistor R6, into B2. Diode D2 prevents the reverse flow of current from battery B2 to Vunreg in the event of a failure of the primary power source.

Comparator U4, in combination with resistors R7, R8, R9, and R10, detects failure of the primary power source by comparing the Vunreg voltage to the voltage at battery B1. When the primary power source fails, the output of U4 transitions from high to low. The state of the comparator U4 output is detected by microcontroller U3.

Transistors Q1, Q2, and Q3, along with resistors R2, R3, R4, and R5, form a power switch circuit which automatically provides power to the base unit circuitry from Vunreg when Vunreg is present, and from battery B1 if Vunreg fails. As was stated, during normal operation Vunreg supplies current to regulators U1 and U2 for distribution to the base unit circuitry. Vunreg also biases resistors R2 and R3, turning on transistor Q3. Q3 pulls the base of Q2 low, thereby turning Q2 off. When Q2 is off, it draws no current from the base of Q1, thereby turning transistor Q1 off. Because Q1 is off, the battery B1 is disconnected from the rest of the circuitry during normal operation.

When Vunreg fails, Q3 is turned off. Battery B1 biases the base of Q2, causing Q2 to turn on Q1. Therefore, current flows from battery B1 through transistor Q1, for regulation by U2 and subsequent distribution to the base unit circuitry 100.

The embodiment of FIG. 1 further includes circuitry for charging the battery of the portable unit when the portable unit and the base unit are engaged and the primary power source has failed. If battery B2 nears depletion while base unit battery B1 has power remaining, microcontroller U3 can temporarily close switch SW1 to transfer energy between batteries B1 and B2 through current-limiting resistor R11.

Figure 2:
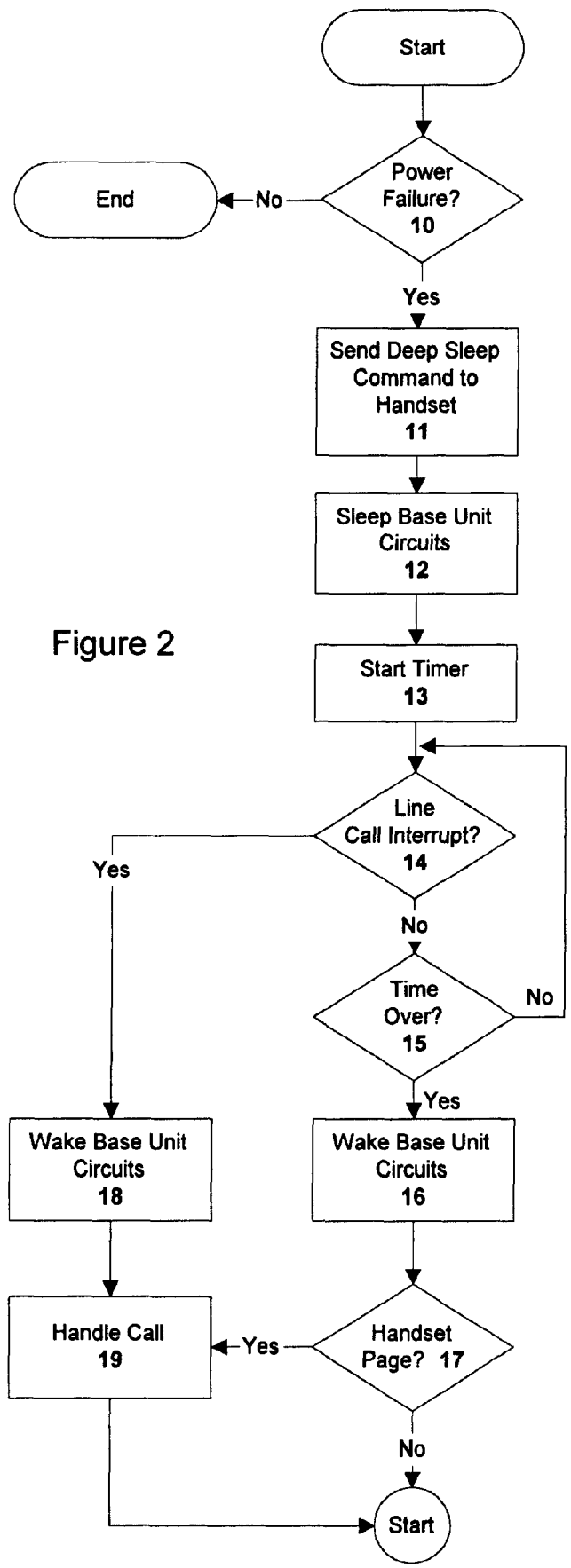
FIG. 2 of the drawings is a flowchart describing the operation of one embodiment of the invention.

The operation of the invention when the primary power source has failed is explained in the flow chart of FIG. 2. When the primary power source fails and a call is not in progress, step 10, the base unit sends a sleep command to the handset, step 11. The base unit then places its own circuitry into a sleep mode in step 12. The sleep mode constitutes a mode of operation in which power consumption is decreased, while the functionality of many circuits is suspended or reduced. In the preferred embodiment, the transmitter and receiver circuits are powered off. Microcontrollers are either placed into a steady state, or operated with clock frequencies reduced from, for example, 8 MHz to 32 kHz. When a devices awakens from a sleep mode, its circuits typically resume their normal functionality.

During the sleep mode, both the base unit and the portable unit awaken periodically. In one embodiment, each unit awakens once every 1.5 seconds. The precise time between awakenings can be varied to suit particular design goals. As the period increases, energy use is reduced, but unit responsiveness is also reduced, forcing a user to wait as much as a full period before the handset responds to an incoming call, or the base responds to the user's attempt to initiate a call. In another embodiment, the period varies in accordance with the level of energy remaining in the backup battery. While the battery is highly charged, the sleep period may be comparatively short, such as 0.5 seconds, thereby providing a high level of responsiveness to the user during shorter power outages. As the battery charge falls, the period between awakenings increases to avoid complete operation outage.

In step 13, the base unit starts a timer during which duration the base unit circuits remain insleep mode. An interrupt is provided by step 14, such that if the base detects an incoming telephone call on the telephone line to which the base unit is connected, the base unit circuits are awoken immediately, step 18, and the call is handled, step 19. Otherwise, after the timer has completed its duration, step 15, the base unit circuits are awoken in step 16.

When the base unit awakens from the power-conserving mode of operation, its receiver scans for radio transmissions emanating from the portable unit which would indicate that the portable unit is initiating a telephone call, or engaging in some other communication which requires base unit participation. Similarly, when the portable unit awakens, its receiver scans for radio transmissions emanating from the base unit that would indicate a telephone call is being received. This sleep mode operation of the portable unit may differ from conventional power-conserving handset operation in that the time period between awakenings can be increased from the typical 0.5 seconds or less to match the base unit and further reduce power consumption.

In step 17, the base unit receiver then scans for radio transmissions emanating from the portable unit which would indicate that the portable unit is paging the base unit to initiate a telephone call, or engaging in some other communication which requires base unit participation, such as an intercom connection. If the base unit detects paging by the handset, the base unit handles the call, step 19. If the base unit does not detect any paging by the handset in step 17, the base unit returns to the start of the power-failure operation cycle of FIG. 2.

The foregoing descriptions and drawings merely explain and illustrate the invention and the invention is not limited thereto except insofar as the appended claims are so limited, as those skilled in the art who have the disclosure before them will be able to make modifications or variations therein without departing from the scope of the invention.

I claim:

1. A method for extending the duration over which a cordless telephone system can operate without an external source of power, which telephone system includes a base unit with a transmitter, receiver, and first backup battery pack, and a portable unit with a transmitter, receiver, and second backup battery pack, the method comprising the following steps:

determining that power is not being supplied to the base unit from an external source;

determining that a telephone call is not being handled by the cordless telephone system;

sending a sleep command to the portable unit if the external power supply is absent and a telephone call is not being handled;

placing the base unit into a state of reduced power consumption;

pausing for a period of time;

ceasing operation in the state of reduced power consumption;

determining whether the cordless telephone system is active;

placing the base unit back into a sleep mode when the cordless telephone system is not active and power is not being supplied to the base unit from an external power source.

2. The method of claim 1, in which the step of pausing for a period of time is terminated immediately if an incoming call is detected on the telephone line to which the base unit is connected.

3. The method of claim 1, in which the step of pausing for a period of time is comprised of the following substeps:

determining the level of power remaining in the first backup battery;

pausing for a period of time corresponding to the level of power remaining in the first backup battery.

4. The method of claim 3, in which the period of time over which the base unit pauses in a sleep mode increases as the energy level remaining in the first backup battery decreases.

5. The method of claim 1, in which the step of determining whether the cordless telephone system is active comprises the substeps of:

scanning with the base unit receiver for signals transmitted by the portable unit;

determining that the cordless telephone system is active if the base unit detects a signal transmitted by the portable unit.

6. The method of claim 1, in which the step of determining whether the cordless telephone system is active comprises the substeps of:

scanning with the base unit receiver for signals transmitted by the portable unit;

detecting whether or not a telephone call is being received on the telephone line to which the base unit is connected;

determining that the cordless telephone system is active if the base unit detects a signal transmitted by the portable unit or a telephone call on the telephone line.

* * * * *